US009866677B1

(12) United States Patent
Maguire

(10) Patent No.: US 9,866,677 B1
(45) Date of Patent: Jan. 9, 2018

(54) MOBILE DEVICE MONITORING SYSTEM

(71) Applicant: Michael K Maguire, Ambler, PA (US)

(72) Inventor: Michael K Maguire, Ambler, PA (US)

( * ) Notice: Subject to any disclaimer, the term of this patent is extended or adjusted under 35 U.S.C. 154(b) by 0 days.

(21) Appl. No.: 14/883,562

(22) Filed: Oct. 14, 2015

(51) Int. Cl.
| H04M 1/00 | (2006.01) |
| H04M 1/725 | (2006.01) |
| H04B 1/3888 | (2015.01) |
| H04M 1/60 | (2006.01) |
| G01S 19/13 | (2010.01) |

(52) U.S. Cl.
CPC ......... *H04M 1/72577* (2013.01); *G01S 19/13* (2013.01); *H04B 1/3888* (2013.01); *H04M 1/6075* (2013.01)

(58) Field of Classification Search
CPC ...... H04M 1/04; H04M 1/0264; H04B 1/3888
USPC ...................................................... 455/575.1
See application file for complete search history.

(56) References Cited

U.S. PATENT DOCUMENTS

| 5,703,946 A | 12/1997 | Chen |
| 5,833,100 A | 11/1998 | Kim |
| 5,996,866 A | 12/1999 | Susko |
| 6,341,218 B1 | 1/2002 | Poplawsky |
| 6,366,672 B1 | 4/2002 | Tsay |
| 6,477,391 B1 | 11/2002 | Muramatsu |
| 6,491,194 B2 | 12/2002 | Marvin |
| 6,771,946 B1 * | 8/2004 | Oyaski ................ H04M 1/6075 340/936 |
| 6,955,280 B2 | 10/2005 | Saitoh |
| 7,099,706 B2 | 8/2006 | Lejman |
| 7,292,823 B2 | 11/2007 | Kuo |
| 7,907,903 B2 | 3/2011 | Shen |
| 7,934,577 B2 | 5/2011 | Walter |
| 7,999,656 B2 | 8/2011 | Fisher |
| 8,078,237 B2 | 12/2011 | Bury |
| 8,328,055 B1 | 12/2012 | Snyder |
| 8,401,521 B2 | 3/2013 | Bennett |
| 8,428,665 B1 | 4/2013 | McLaughlin |
| 8,472,923 B2 | 6/2013 | Fellingham |
| 8,496,144 B2 | 7/2013 | Son |
| D697,305 S | 1/2014 | Culver |
| 8,805,349 B2 | 8/2014 | Frye |
| 8,818,465 B1 | 8/2014 | Gorham |
| 9,300,347 B1 * | 3/2016 | Coverstone .......... H04B 1/3888 |

(Continued)

OTHER PUBLICATIONS

"Cellphone Dock Ignition Lock Keeps your Kid from Texting . . ." Mar. 18, 2013 http://gizmodo.com/5991055/prevent-texting-and-driving-by-docking-your-phone-in-this-ignition-lock.

(Continued)

*Primary Examiner* — Raj Chakraborty
(74) *Attorney, Agent, or Firm* — Muskin and Farmer LLC

(57) ABSTRACT

A mobile device case and monitor for discouraging cell device usage (web, texting, voicemail, games, apps, etc.) device during specific activities (while driving, working, at school, etc.) The case has sensors to detect whether the case is open or closed and whether a cell device is located inside the case. If a driver's cell device is not placed inside the case with the lid closed and the user's vehicle is not stationary, then an alert is generated indicated that the driver is maintaining an unsafe condition. If an employee's cell device is not placed inside the case with the lid closed and the employee is on company time, then an alert is generated indicated that the employee is not adhering to corporate procedures.

18 Claims, 5 Drawing Sheets

(56) References Cited

U.S. PATENT DOCUMENTS

| | | | | |
|---|---|---|---|---|
| 2002/0176571 A1 | | 11/2002 | Louh | |
| 2003/0045332 A1 | | 3/2003 | Lopez | |
| 2005/0184857 A1 | | 8/2005 | Roatis | |
| 2006/0058070 A1 | | 3/2006 | Chang | |
| 2007/0072616 A1 | | 3/2007 | Irani | |
| 2008/0157712 A1 | | 7/2008 | Garcia | |
| 2008/0318517 A1 | | 12/2008 | Bury | |
| 2010/0210254 A1 | | 8/2010 | Kelly | |
| 2010/0215188 A1 | | 8/2010 | Wilcox | |
| 2011/0024470 A1 | | 2/2011 | Hajarian | |
| 2011/0039581 A1 | | 2/2011 | Cai | |
| 2011/0054789 A1 | * | 3/2011 | Yoon | B60R 11/0211 701/469 |
| 2011/0140961 A1 | | 6/2011 | Yeh | |
| 2011/0185390 A1 | | 7/2011 | Faenger | |
| 2011/0275321 A1 | | 11/2011 | Zhou | |
| 2011/0304963 A1 | | 12/2011 | Luksik | |
| 2012/0040665 A1 | | 2/2012 | Liu | |
| 2012/0046020 A1 | | 2/2012 | Tomasini | |
| 2012/0046083 A1 | | 2/2012 | Klett | |
| 2012/0214408 A1 | | 8/2012 | Chronister | |
| 2012/0214463 A1 | | 8/2012 | Smith | |
| 2012/0223196 A1 | | 9/2012 | Musselman | |
| 2013/0025511 A1 | | 1/2013 | Maxwell | |
| 2013/0151111 A1 | | 6/2013 | Skelton | |
| 2013/0163768 A1 | | 6/2013 | Salter | |
| 2013/0193706 A1 | | 8/2013 | Minelli | |
| 2014/0008405 A1 | | 1/2014 | Beaver | |
| 2014/0011471 A1 | | 1/2014 | Khosla | |
| 2014/0018056 A1 | | 1/2014 | Miyake | |
| 2014/0024347 A1 | | 1/2014 | Carter | |
| 2014/0128128 A1 | | 5/2014 | Bunton | |
| 2014/0243051 A1 | | 8/2014 | Hooks | |
| 2014/0367429 A1 | | 12/2014 | Duran | |
| 2015/0011160 A1 | * | 1/2015 | Jurgovan | H04B 5/0031 455/41.1 |
| 2015/0054639 A1 | | 2/2015 | Rosen | |
| 2015/0156297 A1 | * | 6/2015 | Crawford | H04M 1/0262 455/26.1 |
| 2015/0338436 A1 | * | 11/2015 | Loeffler | G01P 1/127 702/141 |
| 2016/0050309 A1 | * | 2/2016 | Gooberman | H04M 1/72577 455/418 |
| 2016/0098983 A1 | * | 4/2016 | Lehmann | G10K 11/175 455/575.1 |
| 2016/0241807 A1 | | 8/2016 | Kovac | |

OTHER PUBLICATIONS

"The Origo Solution for Fleets", Mar. 28, 2013 https://web.archive.org/web/20130318005212/http://www.driveorigo.com:80/commercial/origo-driving-benefits.

"The Origo Solution", Mar. 18, 2013 https://web.archive.org/web/20130318035255/http://www.driveorigo.com:80/consumer/origo-features-benefits.

* cited by examiner

MOBILE DEVICE MONITORING SYSTEM

BACKGROUND OF THE INVENTION

Field of the Invention

The present general inventive concept is directed to a method, apparatus, and computer readable storage medium directed to a method and system for monitoring and preventing mobile device usage.

Description of the Related Art

Accidents due to cell phone usage while driving (talking, texting, etc.) are a serious problem. It has been reported that 25% of accidents are currently caused by texting while driving.

What is needed is a way to discourage or eliminate cell phone usage while a driver is driving.

SUMMARY OF THE INVENTION

It is an aspect of the present invention to provide an improvement in technology relating to reducing cell phone usage while driving.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
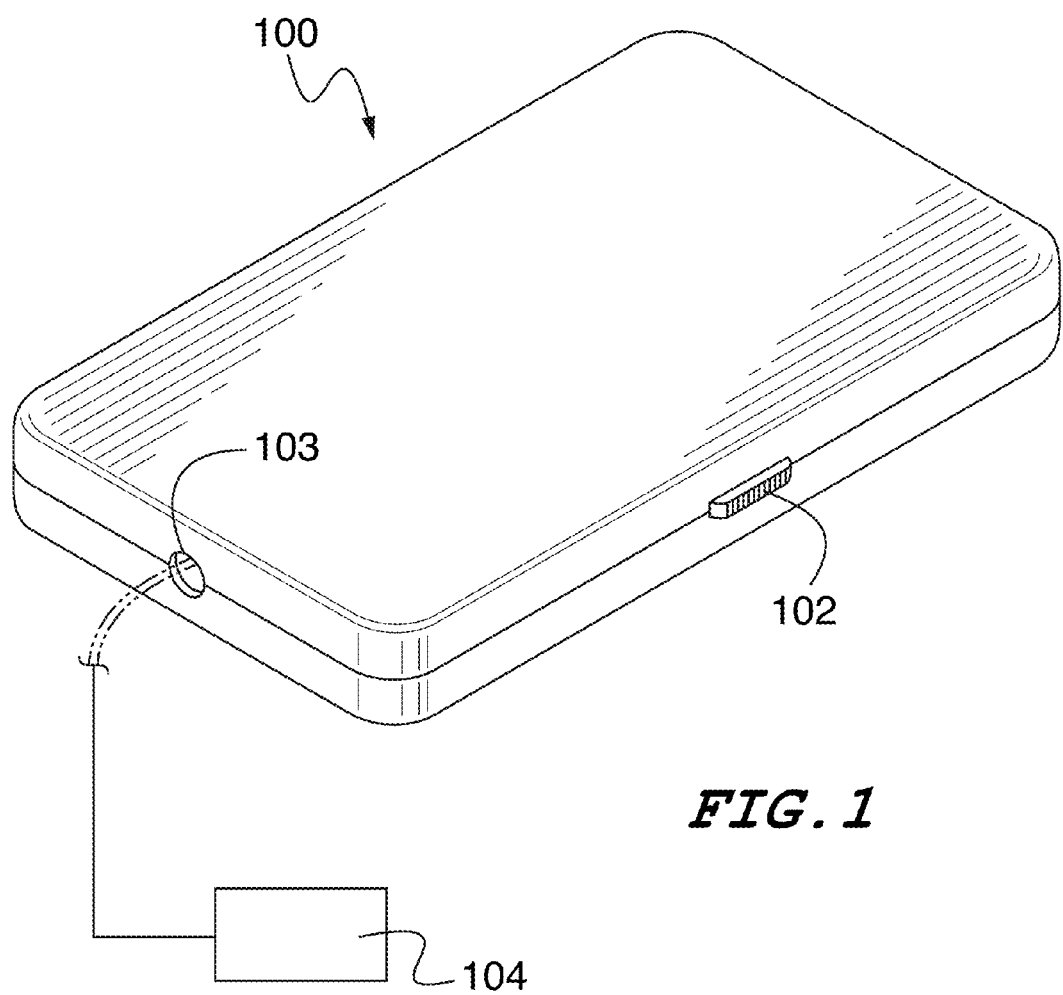
FIG. 1 is a drawing of a closed cell device case, according to an embodiment.

Reference will now be made in detail to the presently preferred embodiments of the invention, examples of which are illustrated in the accompanying drawings, wherein like reference numerals refer to like elements throughout.

The present inventive concept relates to a cell device case which can discourage cell device usage while driving (all the time or during specific time frames). A cell device can be a cell phone (including a smart phone with a touch screen display and IOS or ANDROID (or other) operating system), tablet (with wireless communication capability), smart watch, etc. More particularly, the cell device case can detect when a cell device is placed inside the case and the case is closed. When a cell device is placed inside a closed case, then the cell device can only be used hands-free and cannot be used for visual required functions (texting, etc.) because the owner of the cell device cannot see the cell device or press its buttons. The inventive concept herein detects whether the cell device is or is not in the closed case when the car (or other vehicle) is being operated. It can also be detected when the cell device is not in the closed case when the employee is on business time (e.g., the cell device is elsewhere but not in the closed case). If the vehicle is being operated when the cell device is not secured in the closed case, then an alert is triggered. The system tracks when alerts have been generated and stores them in a database. In this manner, a user who misuses his/her cell device (by using it when operating the vehicle) can be subject to penalties by a party who is monitoring the logs. For example, an employer can maintain logs of all cell device usage while driving and employees who have engaged in this practice may be subject to penalties (e.g., no bonus, etc.)

The system described herein can also track device usage during specific time frames, prevent or discourage distracted driving or operating of motorized vehicles, prevent usage during specific time frames as directed by employers, parents, etc. The case can also lock the cell device away from view by others. Thus, the system described herein can enable employers to maintain control of their employees' use of smart devices (e.g., cell phones) during business hours. Parents can also maintain control of their children's smart device usage (all the time or during specific time frames).

FIG. 1 is a drawing of a closed cell device case, according to an embodiment.

A cell device case 100 is in the closed position. A latch 102 is used to open the case. A charging hole 103 is used so that a charging cable cord from a charger 104 can be inserted into the case 100 so that the device (not pictured in FIG. 1) can be charged while it is inside the case 100. The operator can remove the cell device by pressing on the latch 102 and then opening the case. In a further embodiment, instead of the charger being separate from the case 100 the charger can actually be located inside the case 100 and thus the charging hole 103 would not be necessary (however a connection from the charger inside the case may be necessary to the car battery or other external power supply). In an embodiment, a passcode would be required to lock (after the cell device has been placed inside the case) and unlock the latch (to open the case to remove the cell device). The passcode can be a series of numbers or characters which can be spoken or typed into a keypad (not pictured) on the case. Such a locking device on the case is optional and not required. In an embodiment, the case/system won't consider the cell device to be inside the case unless the cell device is inside the case and the locking device is locked.

In an embodiment, when the device is placed inside the case and plugged into the charger, the device can sync with the case and thus track the times that the device is secured inside the closed case. Note that in an embodiment, the charger is not required. This time can be transmitted by the case wirelessly to be stored on a remote server (see FIG. 5). In an embodiment, the GPS from the device and the time of day can also be transmitted from the device to the case (thus obviating the need for the case itself to need a GPS and time of day system), although in another embodiment the case would have its own GPS and time of day clock (thus not requiring this data from the device).

In an embodiment, the case can have a lock which can unlock with a physical key, combination, etc.

In an embodiment, when the cell device is inside the closed case the cell device can still integrate with a Bluetooth headset such that the driver of the car can still take calls using a Bluetooth headset ("hands-free") and thus not be considering driving in unsafe conditions. An "app" running on the cell device can be configured as whether to allow the driver to operate the device in hands-free mode or not (while the device is secured inside the closed case). Note that when the cell device is inside the closed case, the cell device is still enabled to operate in any mode which does not require visual inspection by the user. For example, the user can talk hands-free, use voice dialing and calling, use voice enabled apps, the GPS on the cell device can still operate, etc.

Note that the app running on the device would be downloaded and installed like any other app. The app would allow the user (or the user's employer, parent, etc.) to configure the system, for example, specify the frequency of transmissions to the remote server for the log, specify what happens if the user is driving when the cell device is not inside the closed case. For example, the device can be set to ring (or make a noise) when the vehicle is operated while the device is not positioned inside the closed case and the noise will shut off once the cell device is put inside the closed case (or the vehicle becomes stationary).

Figure 2:
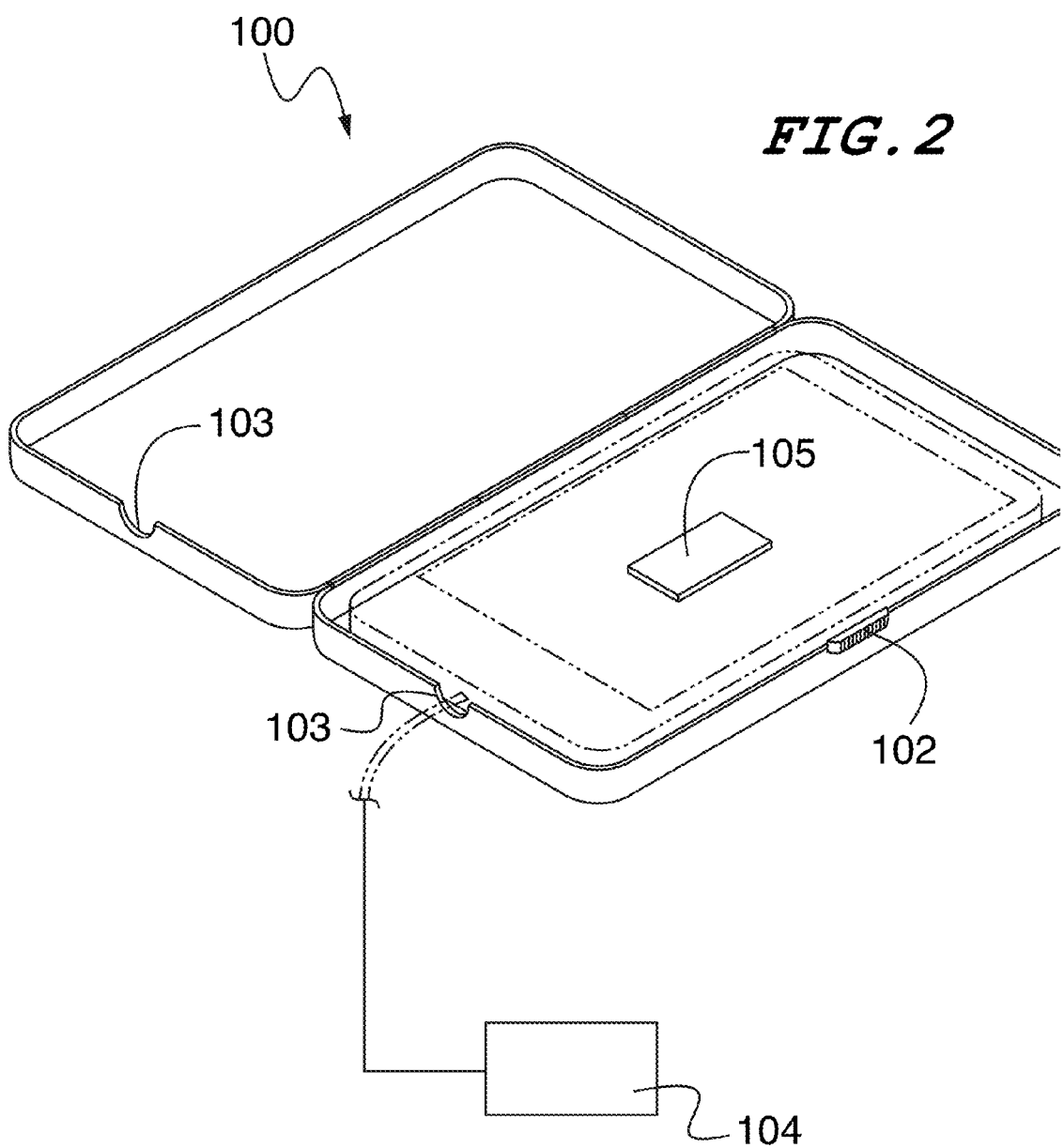
FIG. 2 is a drawing of an open cell device case, according to an embodiment.

FIG. 2 is a drawing of an open cell device case, according to an embodiment.

A sensor 105 is located inside the case which can detect if the cell device is in the case (e.g., by weight). When the cell device case is closed and the cell device is present inside the case is the secured position. When the user operates a vehicle while the cell device is in the secured position, the user cannot operate the cell device (because the cell device is disabled from) using any operation which requires visual inspection and/or physical manipulation and thus is safe. For example, operations which require visual inspection and/or physical manipulation include dialing numbers on keyboard on the cell device, typing anything on a keyboard (real or virtual) such as texting, interacting with a touch-screen, using any app which requires touching the touch-screen or buttons on the cell device, etc. Note that operations which do not require touching or looking at the cell device are still operative, such as voice-dialing and calling (no looking or touching required), apps that require voice control only (e.g., an interactive virtual assistant which speaks and is spoken to). In one embodiment the case serves to disable operations on the cell device which require visual and/or physical touching because the case prevents touching and obstructs vision. In another embodiment, disabled operations are actually disabled on the cell device by an app (program) which runs on the cell device which temporarily disables these operations by instructing the cell device to pause execution of the code for any of these disabled apps until the app terminates these instructions thereby enabling these operations again. The latch also has a sensor can detect whether the case is in the closed position or in the open position.

When the cell device is inside the case it will sync with the device wirelessly device and verifies that the device is actually the correct/specific device. The sync can be done as known in the art. When the charging cable is plugged into the cell device (which means the cell device must be inside the case). Alternatively, the sync between the case and the cell device can be done wirelessly as long as the cell device can be physically verified to be inside the case. Syncing entails that the case verifies the cell device's identity (e.g., confirming a unique identifier (such as a serial number) of the cell device and all relevant data can be exchanged between the case and the cell device. The case can also have access to functions on the cell device such as its GPS, time of day, apps, etc. In an embodiment, the case can initiate a particular app to run and take control of the cell device, such as disable any operation which requires the user to visually look at the cell device. Access to the cell device's GPS can be continuous so the case can continuously monitor and record all of its GPS coordinates without requiring the case to have its own GPS capability. Note that if the case is closed and the device is not in the case, the sensor should detect that no device is present inside the case and record this information. Note that if the system detects device usage while the device is detected as being inside the closed case, then a fraud alert would be triggered and transmitted (and stored on the remote server) that this user has somehow managed to defeat the system. When a cell device is synced to the case the "sync" status is maintained such that the cell device knows it is synced to this particular case and the case knows it is currently synced to the cell device. When the charging cable is unplugged and/or the cell device is removed from the case then the sync is terminated. Note that each cell device can only sync to one case at a time. If there are multiple cases within the vicinity and the sync is accomplished wireless (instead of via a cable such as a charging cable) then the cell device would only sync to one case only. If the cell device is currently synced to a device then it would not be able to sync to another case unless it was de-synced from the case it is currently synced to. In addition to the cell device syncing with the case, the cell device can also sync with other devices simultaneously such as the car itself (e.g., so hands-free calls can be channeled through the car's speakers, etc.)

In another embodiment, when the device is placed inside the case the device can be connected to the case but does not necessarily need to be charging (e.g., the case does not have a charging cable plugged in). This connection allows the device to sync with the case and the device would use its battery power (the case would have its own battery too which provides the case its power).

Figure 3:
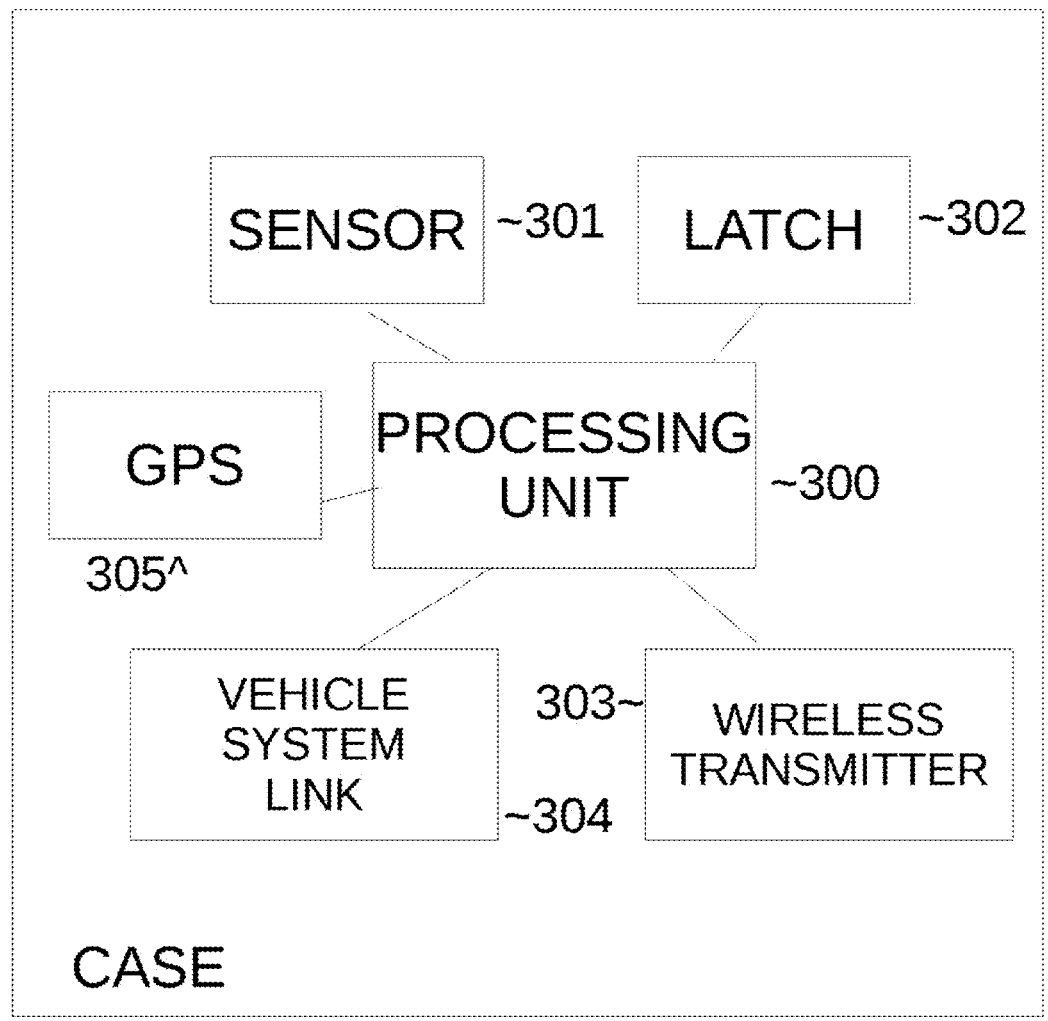
FIG. 3 is a block diagram of a cell device case, according to an embodiment.

FIG. 3 is a block diagram of a cell device case, according to an embodiment.

Inside the case is a processing unit 300 which is a microprocessor. Also inside the case is a sensor 301 which detects when the device is placed inside the case. The sensor 301 can be one of a number of types of sensors, such as a scale which detects a weight of an object placed on top of it (so that if a device placed over the sensor 301 is of at least a particular weight then it can be determined that it is a cell device). The sensor 301 can alternatively be an optical sensor which detects light so that if a cell device is placed over the sensor 301 then it is determined that the cell device is inside the case. The sensor 301 can also be a wireless communication device (such as a Bluetooth device) which can communicate wirelessly with the cell device to verify the cell device's identity (the wireless communications can only take place at very short distances thus confirming that the cell device is actually inside the case). A latch 302 is used to open the case and also can detect when the case is open and closed, and the latch 302 can generate an electrical signal indicating whether the case is open or closed. Also inside the case is a GPS 305 which can detect the location of the case using global positioning satellites. A wireless transmitter 303 enables data to be communicated to and from the internet wirelessly (e.g., using a cellular data connection). In this manner, data representing the state of the case (e.g., open or closed) and vehicle usage can be transmitted wirelessly to a remote database. A vehicle system link 304 can connect the processing unit 300 to the vehicle's transmission so that it can be determined which gear the car is in (park, drive, reverse, etc.)

The processing unit 300 is connected to (and can communicate with) the sensor 301, latch 302, wireless transmitter 303, vehicle system link 304 and the GPS 305. Note that the processing unit 300 inside (or on) the case implements an entirely functional computer system. Thus, the case can perform numerous functions, which include (but not limited to) syncing with the device (and transfer relevant data from the device to the case), utilize the device's GPS receiver to determine the devices location (if this is done then the separate GPS 305 hardware would not be needed), communicate with the vehicle (via the vehicle system link) to determine which gear the car is currently in. The case (via the processing unit) can perform any needed function in order to accomplish any and all of the functions described herein. All data regarding the status of the cell device (e.g., times operated, whether vehicle is being operated, whether cell device is in case, etc.) is uploaded to a remote server (can be stored permanently or automatically deleted after a predetermined amount of time). The processing unit 300 is also connected to any other apparatus/device needed to carry out any other operation described herein. The processing unit 300 can also be connected to a random access memory and/or a non-volatile long-term storage memory. The processing unit 300 can execute code stored on the RAM or long-term storage memory which is programmed to implement any of the operations described herein that the case can perform.

Figure 4:
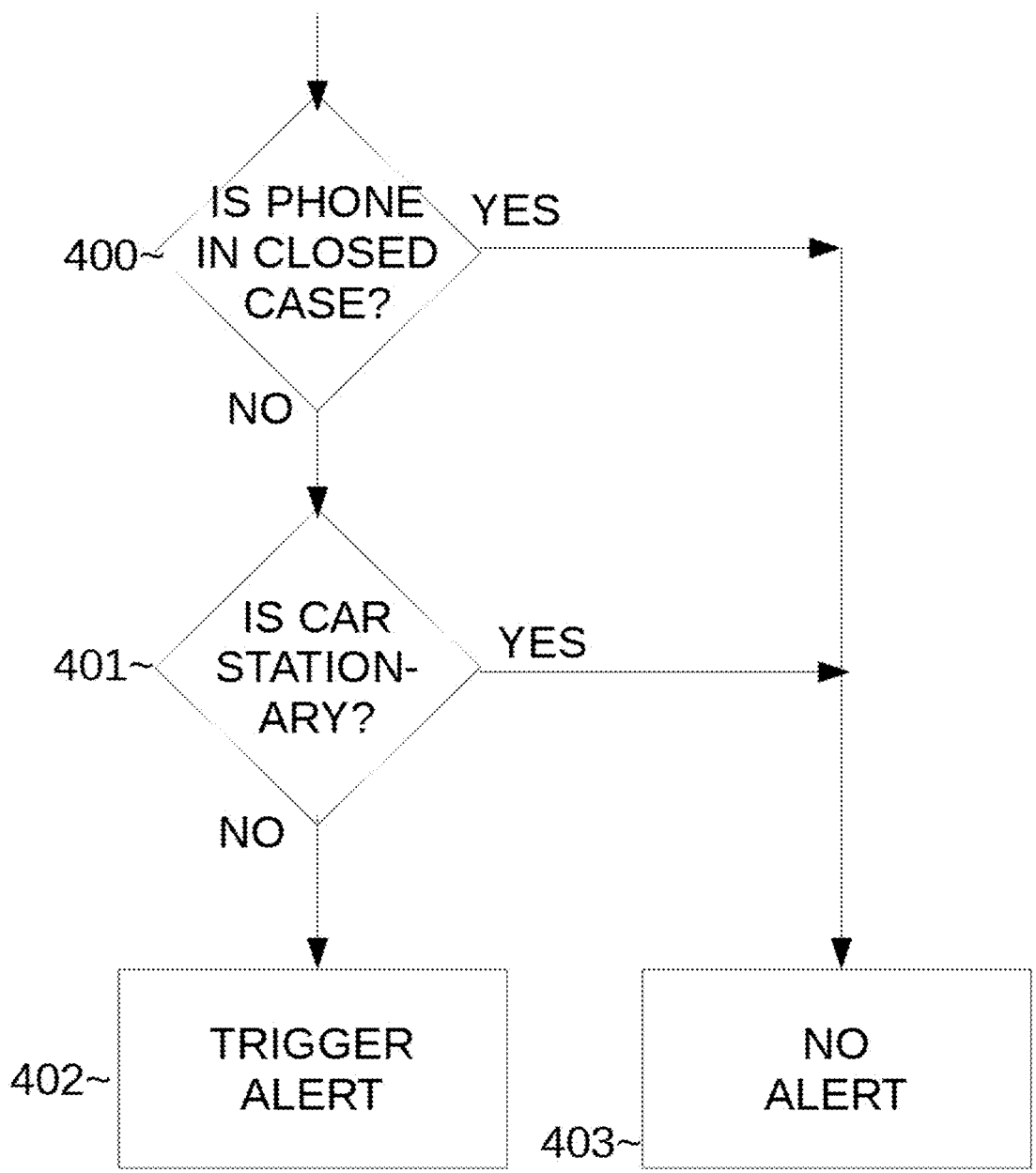
FIG. 4 is a flowchart illustrating a method of determining alerts, according to an embodiment.

FIG. 4 is a flowchart illustrating a method of determining alerts, according to an embodiment.

In operation 400, it is determined whether the device is in a closed case. This can be determined by determining if the sensor is being activated (an object is put on top of the sensor) and if the door is closed (by checking the latch). If both the sensor is activated and the latch is in the closed position then the case is closed with a device inside. If the case is closed with a device inside, then the method proceeds to operation 403.

If in operation 400, the device is not in a closed case (e.g., the device is not in the case or the device is in the case but the case is open) then the method proceeds to operation 401.

In operation 401, it is determined whether the car (vehicle) is stationary. This can be determined in numerous ways by a vehicle status detector. For example, a GPS signal can be used to determine whether the car is moving or stationary (for example, if the current location of the GPS device inside the vehicle changes at a velocity representative of motion of a vehicle, then it would be concluded that the vehicle is in motion otherwise the vehicle can be considered stationary). In this embodiment the vehicle status detector is a circuit which has its own GPS functionality or can access GPS functionality on another device which determines whether the vehicle is in motion or not by monitoring GPS coordinates over time. In another embodiment, the processing unit 300 is connected to the vehicle system link 304 which can receive a signal from the car's transmission unit to determine which gear the car is currently in. If the car is in park then this is considered stationary. If the car is not in park (e.g., reverse, or drive) then this would be considered moving. In this embodiment the vehicle status detector is the vehicle system link and the logic to determine and transmit whether the car is in park, drive, etc. If the car is considered stationary, then the method proceeds to operation 403.

If in operation 401, it is determined that the car is moving, then the method proceeds to operation 402. In operation 402, an alert is triggered. This alert means that the operator of the vehicle is operating the vehicle without the cell device being inside the case in the closed position. This condition is hazardous as the device may ring or receive a text hence distracting the driver while he/she is driving the vehicle. Thus, an alert is triggered. A signal can be transmitted by the case (using the wireless transmitter 303) to a remote database which stores a log of statuses from the case. In other words, each time operation 402 is reached a signal is transmitted to the remote database indicating the current alert status (that the vehicle is being operated in an unsafe condition), time, date, the device status (that the cell device is not currently in the closed case) and other information which may be option such as the user name (each user of the system has a unique user name to identify that user), location of the vehicle (determined via GPS). Note that an alert can be sent to another party, such as the driver's employer, immediately via a wireless signal so that the other party is alerted to this drivers unsafe driving.

In operation 403, no alert is generated meaning the vehicle is not being operated in a hazardous manner (the vehicle is stationary or if it is moving the cell device is secured in the case while closed). A signal is still transmitted to the remote database indicating the current status (that the vehicle is being operated in a safe condition), the current time, date, the device status (whether the cell device is placed in the closed case or not), user name, and optionally the vehicle's location (determined using GPS). Note that the case also transmits an identifier of the case and/or the cell device so that the remote server can identify which case and/or cell device the current stream of data is directed to.

Note that the method illustrated in FIG. 4 will continuously repeat, thus generating a continuous log of vehicle status which is stored by the remote database and can be retrieved at any time and viewed. Table I below illustrates one example of a status log which is generated by the method illustrated in FIG. 4 (in conjunction with the remainder of the system described herein). All of the data shown (e.g., date, time, device status, vehicle status, username, etc.) is continuously monitored, recorded, and transmitted to the remote server for storage and later retrieval. The current time can be continuously transmitted or in an embodiment it does not need to be transmitted since the recipient of the data (e.g., the remote server) would know the current time and the delay for such transmissions is small. Any other data described herein (or needed for proper operation) can also be continuously monitored, recorded and transmitted to the remote server as well, such as the usage status of the cell device (whether the cell device is being used and for what purpose (e.g., a call, etc.), the phone numbers called (or number of a caller into the device), the apps being used, whether the case is locked or unlocked, etc. The "continuous" monitoring (and hence transmission and recording) can mean at periodic discrete intervals (e.g., every minute, every 30 seconds, every second, etc.) Data transmitted by the case and stored also includes an identifier of the case and can also include an identifier of the cell device as well. The identifier is a unique code (or number, string, etc.) which uniquely identifies the case and phone so that it is known which case and/or phone the data stream is monitoring (directed to). The Device status "in case" means that the cell device is inside the case (as detected by the sensor or other detection mechanism) and the case is closed (in an embodiment the case would also have to be locked). "Out of case" means that the cell device is not inside the case or that the case is not closed (even though the cell device is inside the case), or in an embodiment the case is not locked even though the cell device is inside the case. The system can be configured to set what conditions are required for the device status to be in the case and what conditions are required for the device to be out of the case.

TABLE I

| Date | time | device status | vehicle status | username |
|---|---|---|---|---|
| Sep. 1, 2015 | 12:00 am-09:03 am | out of case | stationary | Jack Smith |
| Sep. 1, 2015 | 09:03 am-09:04 am | in case | stationary | Jack Smith |
| Sep. 1, 2015 | 09:04 am-10:15 am | in case | driving | Jack Smith |
| Sep. 1, 2015 | 10:15 am-10:16 am | in case | stationary | Jack Smith |
| Sep. 1, 2015 | 10:16 am-3 :27 pm | out of case | stationary | Jack Smith |
| Sep. 1, 2015 | 03:27 pm-05:03 pm | in case | driving | Jack Smith |
| Sep. 1, 2015 | 05:03 pm-11:59 pm | out of case | stationary | Jack Smith |
| Sep. 2, 2015 | 12:00 am-09:05 am | out of case | stationary | Jack Smith |
| Sep. 2, 2015 | 09:05 am-10:20 am | in case | driving | Jack Smith |
| Sep. 2, 2015 | 10:20 am-10:22 am | out of case | driving | Jack Smith |
| Sep. 2, 2015 | 10:22 am-11:59 pm | out of case | stationary | Jack Smith |

Note that on Sep. 2, 2015 at 10:20 am to 10:22 am the cell device was out of the case while the vehicle was being operated. This would have triggered an alert which was (optionally, depending on the embodiment being implemented) transmitted to a party in order to take some action. For example, this alert could be transmitted to the driver's employer who may call the driver's cell device to call him to put away the device (or stop driving the car). An audible alarm (such as a beeping noise) located in the car can also be activated as well in response to this alert in order to notify the driver to stop driving while the device is not secured in the closed case.

Note that the username can be determined in numerous ways. In one embodiment, each case itself is assigned a username by the employer (or other administrator of the system). In another embodiment, the name comes from the cell device itself during the sync between the device and the case (the sync can either be through the charging cable or wireless). Note that this sync can also validate the device to make sure that a "dummy" device is not utilized. For example, the system can be programmed to expect a particular device for a particular case. If the user tries to use a different device, the device identification will be identified by the case (during a sync) and will not be validated (because it will not match the ID of the device that is supposed to be used for the respective case). The case itself or the remote server (which then gets transmitted to the case) would store the ID (a unique identifier) for the device. If a different device is inserted into the case, then this would trigger a special alert to the user's employer alerting them to the fact that a foreign device has been inserted into the case (this data would also appear in the log for this case as well).

Note that the determination of whether the user is operating the cell device when the car (also referred to as "vehicle herein") is in operation can be determined locally by the case (and transmitted to the remote server) or remotely at the remote server (or other computer accessing data at the remote server). For example, if the remote server stores a continuous stream of data indicating the time, whether the cell device is in the case or not, and the location coordinates of the case, then it can be determined later at time at which times the cell device was not in the case when the car was in motion (by seeing at which times the car was in motion and the cell device was not present in the case at that time).

Figure 5:
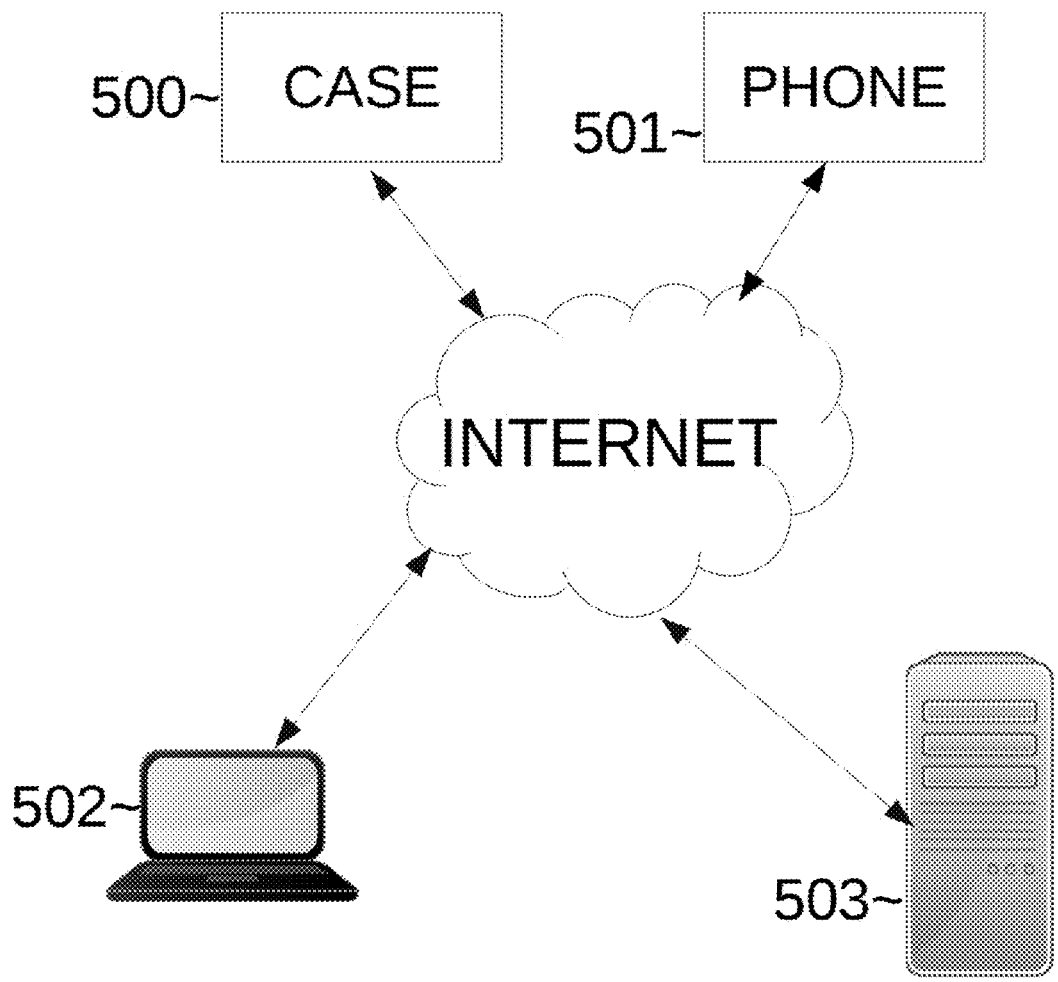
FIG. 5 is a block diagram illustrating different parts of the overall system, according to an embodiment.

FIG. 5 is a block diagram illustrating different parts of the overall system, according to an embodiment.

The case 500 has its own wireless transmitter which can communicate independently with the internet (and hence a remote server 503). The device 501 also can communicate wireless with the internet (and hence the remote server 503). The remote server 503 is a server that communicates wireless with the case 500 and the device 501. The remote server 503 stores a log of statuses of each case such as illustrated in Table I. A computer 502 (such as a personal computer, laptop, etc.) can be used to connect to the internet to access the data on the remote server 503. In this manner, an employee of a company that the driver works for can log into the remote server 503 and view all of the logs for all of the cases owned by the company. The remote sever 503 can run an SQL (or other) database so a person can log in and retrieve only the information they wish to retrieve (e.g., they may want to pull up data for a particular user (e.g., Jack Smith) on a particular date). The remote server 503 can also generate a report of all drivers who were non-compliant (drove at least once without their cell device being secured inside the closed case) for a specified period of time.

The remote server 503 can also provide a real time tracker for any case registered to a particular employer. For example, an employer at any time can log into the remote server 503 and check on the status of a particular case (e.g., its location, open or closed with device status, vehicle stationary or moving status, etc.) The remote server 503 can be programmed (by storing computer readable instructions on a memory which is executed by a microprocessor on the remote server 503) to perform any of the operations described herein which can be performed by the server 503.

In a further embodiment, the invention described herein is not limited to being used on a vehicle. It can be used in other contexts where distractions from cell devices should be avoided. For example, it can be utilized for children at school (during class they would be required to keep their cell devices in their closed cases), babysitters or day care workers (should also keep their cell devices in their closed cases while on the job), air traffic controllers, lifeguards, emergency operators, etc. The system can be programmed with particular times and if the cell device is not in the case in those particular times then an alert can be triggered. For example, the system can be programmed that a student has a class at 1 pm to 3 pm every Thursday, and if the cell device is not put inside the case on those times then an alert can be triggered (e.g., to the school, the student's parents, etc.) if the cell device is put inside the case during those times then the alert would not be triggered.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A cellular device monitoring system, comprising:
   a cell device case comprising a first sensor configured to detect whether a cell device is present inside the case and a second sensor configured to detect between the case being open and closed;
   wherein the cell device case is configured such that the cell device cannot be removed from the cell device case in response to the cell device case being closed;

a vehicle status detector configured to detect between a vehicle being stationary and moving; and a transmitter configured to continuously transmit to a remote server data indicating a case status indicating whether the cell device is inside/not inside the case;

wherein the remote server is configured to store a continuous stream of data comprising device status data representing whether the cell device is present inside the case while closed and vehicle status data representing a status between stationary and moving;

wherein the cell device case is configured such that in response to the vehicle moving and the cell device not being present in the cell device case while closed, an audible alarm triggers inside the vehicle.

2. The system as recited in claim 1, wherein the transmitter is further configured to continuously transmit to the remote server GPS data indicating a location of the case.

3. The system as recited in claim 1, wherein the vehicle status detector comprises a GPS system which is used to determine between the vehicle being stationary and moving.

4. The system as recited in claim 1, wherein the vehicle status detector comprises a vehicle system link configured to receive a signal from the vehicle indicating which gear the vehicle is currently in.

5. The system as recited in claim 1, wherein the continuous stream of data further comprises identification data identifying the cell device.

6. The system as recited in claim 1, wherein the remote server is further configured to enable a remote computer to log into the remote server and retrieve the continuous stream of data associated with the cell device case.

7. The system as recited in claim 1, wherein the cell device case further comprises a GPS unit configured to detect location using global positioning satellites and transmit data representing the location to a microprocessor located inside the cell device case.

8. The system as recited in claim 1, wherein the cell device case further comprises a plug configured to plug into the cell device which triggers the cell device and the cell device case to sync.

9. The system as recited in claim 1, wherein the cell device case further comprises a power source connected to a plug configured to charge the cell device while the cell device is plugged into the plug in the cell device case.

10. The system as recited in claim 1, wherein the cell device comprises an app installed on the cell device enabling preference setting for the system.

11. A cellular device monitoring system, comprising:

a cell device case comprising a first sensor configured to detect whether a cell device is present inside the case and a second sensor configured to detect between the case being open and closed;

wherein the cell device case is configured such that the cell device cannot be removed from the cell device case in response to the cell device case being closed;

a vehicle status detector configured to detect between a vehicle being stationary and moving; and a transmitter configured to continuously transmit to a remote server data indicating a case status indicating whether the cell device is inside/not inside the case;

wherein the cell device case is configured such that in response to the vehicle moving and the cell device not being present in the cell device case while closed, an audible alarm triggers inside the vehicle.

12. A cellular device monitoring method, comprising:

providing a cell device case configured such that a cell device cannot be removed from the cell device case in response to the cell device case being closed;

continuously detecting whether the cell device is present inside the cell device case and detecting between the case being open and closed;

continuously detecting a vehicle status between a vehicle being stationary and moving;

transmitting to a remote server data indicating a case status indicating whether the cell device is inside/not inside the case;

storing by a remote server a continuous stream of data comprising device status data representing whether the cell device is present inside the case while closed and vehicle status data representing a status between stationary and moving; and determining that the vehicle is moving and the cell device is not present in the cell device case which is closed and in response triggering an audible alarm inside the vehicle.

13. The method as recited in claim 12, further comprising continuously transmitting to the remote server GPS data indicating a location of the case.

14. The method as recited in claim 12, further comprising receiving a signal from the vehicle indicating which gear the vehicle is currently in in order to provide the vehicle status.

15. The method as recited in claim 12, wherein the continuous stream of data further comprises identification data identifying the cell device.

16. The method as recited in claim 12, enabling a remote computer to log into the remote server and retrieve the continuous stream of data associated with the cell device case.

17. The method as recited in claim 12, further comprising syncing the cell device and the cell device case.

18. The method as recited in claim 12, further comprising installing an app on the cell device and configuring the method using the app.

* * * * *